US009746083B2

(12) United States Patent
Borasso et al.

(10) Patent No.: US 9,746,083 B2
(45) Date of Patent: Aug. 29, 2017

(54) MECHANICAL SEAL

(71) Applicant: MECCANOTECNICA UMBRA S.p.A., Campello Sul Clitunno (IT)

(72) Inventors: Massimiliano Borasso, Todi (IT); Alessandro Ventura, Terni (IT); Massimiliano Ferri, Campello Sul Clitunno (IT)

(73) Assignee: MECCANOTECNICA UMBRA S.P.A., Campello Sul Clitunno (IT)

( * ) Notice: Subject to any disclaimer, the term of this patent is extended or adjusted under 35 U.S.C. 154(b) by 0 days.

(21) Appl. No.: 14/264,437

(22) Filed: Apr. 29, 2014

(65) Prior Publication Data
US 2014/0319774 A1 Oct. 30, 2014

(30) Foreign Application Priority Data

Apr. 30, 2013 (IT) ................................ TO2013A0352

(51) Int. Cl.
*F16J 15/36* (2006.01)
*F16J 15/34* (2006.01)
(52) U.S. Cl.
CPC .............. *F16J 15/36* (2013.01); *F16J 15/348* (2013.01); *F16J 15/3452* (2013.01)
(58) Field of Classification Search
USPC ....... 277/352, 358, 368–372, 377, 379, 389, 277/390, 393
See application file for complete search history.

(56) References Cited

U.S. PATENT DOCUMENTS

| | | | | |
|---|---|---|---|---|
| 2,075,769 A | * | 3/1937 | McCormack | F16J 15/34 277/379 |
| 2,601,996 A | * | 7/1952 | Sefren | 277/393 |
| 2,884,268 A | * | 4/1959 | Maxime Amirault et al. | 277/362 |
| 2,984,506 A | * | 5/1961 | Andresen | F16J 15/36 277/371 |
| 2,994,547 A | * | 8/1961 | Dolhun et al. | 277/373 |
| 3,355,178 A | * | 11/1967 | Hornaday | 277/373 |
| 3,536,333 A | * | 10/1970 | Gits et al. | 277/372 |
| 3,663,026 A | * | 5/1972 | Mincuzzi | 277/390 |
| 3,782,735 A | * | 1/1974 | Novosad | 277/360 |
| 3,822,066 A | * | 7/1974 | Keys | 277/405 |
| 4,095,807 A | * | 6/1978 | Jandt et al. | 277/374 |
| 4,095,808 A | | 6/1978 | Glasson | |
| 4,275,889 A | | 6/1981 | Butler et al. | |

(Continued)

FOREIGN PATENT DOCUMENTS

| | | |
|---|---|---|
| EP | 2 025 976 | 2/2009 |
| FR | 2 378 997 | 8/1978 |
| WO | WO 02/16810 | 2/2002 |

*Primary Examiner* — Eugene G Byrd
(74) *Attorney, Agent, or Firm* — Leason Ellis LLP

(57) ABSTRACT

A seal designed for insertion between a rotating shaft and a fixed casing having an opening through which the shaft is fitted, the seal having a sleeve designed to fit onto the shaft; a first sealing ring fitted to the sleeve; a cup designed to fit inside the opening; and a second sealing ring connected to the cup by a bellows of elastomeric material; the first and second sealing rings cooperate frontally with each other under the axial load exerted by a spring interposed between the cup and the second sealing ring; and the bellows is connected in angularly free manner to the cup to prevent self-induced torsional oscillation and noise resulting from it.

19 Claims, 2 Drawing Sheets

(56) References Cited

U.S. PATENT DOCUMENTS

| | | | | |
|---|---|---|---|---|
| 4,304,407 A * | 12/1981 | Ashe | ........................... | 277/375 |
| 4,348,030 A * | 9/1982 | Johnston | ..................... | 277/386 |
| 4,359,111 A * | 11/1982 | Gonzalez | ................... | 175/227 |
| 4,558,872 A * | 12/1985 | Vossieck et al. | ............ | 277/379 |
| 4,776,598 A * | 10/1988 | Akema | ........................ | 277/379 |
| 5,375,852 A * | 12/1994 | Charhut | ...................... | 277/371 |
| 5,725,219 A * | 3/1998 | Gilbert | ......................... | 277/377 |
| 5,758,880 A * | 6/1998 | Ice et al. | ...................... | 277/375 |
| 5,964,466 A * | 10/1999 | Hintenlang et al. | .......... | 277/371 |
| 6,007,069 A * | 12/1999 | Sadowski | ..................... | 277/374 |
| 6,145,841 A * | 11/2000 | Maeda | ................ | F16J 15/348 |
| | | | | 277/358 |
| 6,338,489 B1 * | 1/2002 | Nakano | ........................ | 277/385 |
| 6,398,223 B1 * | 6/2002 | Radosav | ...................... | 277/352 |
| 6,485,024 B1 * | 11/2002 | Pippert et al. | ................ | 277/370 |
| 6,568,687 B2 * | 5/2003 | Radosav | ...................... | 277/389 |
| 6,655,694 B1 * | 12/2003 | Nakano | ........................ | 277/370 |
| 6,789,803 B2 * | 9/2004 | Radosav | ...................... | 277/377 |
| 8,128,097 B2 * | 3/2012 | Yasu | ...................... | F16J 15/36 |
| | | | | 277/358 |
| 2005/0230923 A1 * | 10/2005 | Kametaka | ............ | F16J 15/3476 |
| | | | | 277/602 |
| 2007/0108705 A1 | 5/2007 | Dahlheimer | | |
| 2010/0283210 A1 * | 11/2010 | Kirchner et al. | ............ | 277/377 |

\* cited by examiner

MECHANICAL SEAL

The present invention relates to a mechanical seal, and in particular to a mechanical seal designed for insertion between a rotating shaft and an opening through which the shaft is fitted. A preferred, though not exclusive, application of the present invention is in the sealing of rotary pumps, and in particular of automotive engine coolant circulating pumps, hereinafter referred to as a 'water pump' for the sake of simplicity.

CROSS-REFERENCE TO RELATED APPLICATION

The present claims priority to Italian Patent Application No. TO2013A000352, filed Apr. 30, 2013, which is hereby incorporated by reference in its entirety.

BACKGROUND OF THE INVENTION

As is known, an automotive water pump comprises a pump body; a drive shaft; and an impeller housed inside the pump body and fitted to the shaft. The shaft is operated by a pulley, and is fitted through an opening in the pump body, in which it is supported on a bearing.

Sealing between the shaft and the pump body is normally performed by a mechanical seal fitted to the part of the shaft extending axially between the impeller and the shaft bearing.

The mechanical seal comprises a first sealing ring fitted integrally to and rotating with the shaft; and a non-rotating second sealing ring connected to the pump body. The two sealing rings cooperate axially with each other to form a sliding face seal.

More specifically, the second sealing ring is secured to a metal cup, designed to fit inside the opening in the pump body, by means of a bellows of elastomeric material fixed at one end to the cup and at the other end to the second sealing ring; and the first sealing ring is fitted to a sleeve, fitted to the shaft, with the interposition of a ring of elastomeric material.

The mechanical seal also comprises a spring housed inside the cup and compressed between an end wall of the cup and the second sealing ring to push the second sealing ring, with a predetermined work load, against the first sealing ring.

For the seal to function properly, a fluid gap must be ensured where the two sealing rings contact, to prevent severe wear, overheating, and noise. One method of producing ceramic, e.g. silicon carbide, sealing rings with improved surface characteristics is described in WO2007/057934.

Though normally excellent in terms of noise, sealing rings produced using the above process are subject, in the event of poor lubrication, to stick-slip phenomena, which are aggravated by the elasticity of the bellows of elastomeric material, and may result in self-induced torsional oscillation and, therefore, noise.

Demand therefore exists within the industry for further improvement to eliminate noise at the source.

SUMMARY OF THE INVENTION

It is an object of the present invention to provide a mechanical seal designed to meet this demand.

According to the present invention, there is provided a mechanical seal as claimed in Claim 1.

BRIEF DESCRIPTION OF THE DRAWINGS

A preferred, non-limiting embodiment of the present invention will be described by way of example with reference to the attached drawings, in which.

DETAILED DESCRIPTION OF THE INVENTION

Figure 1:
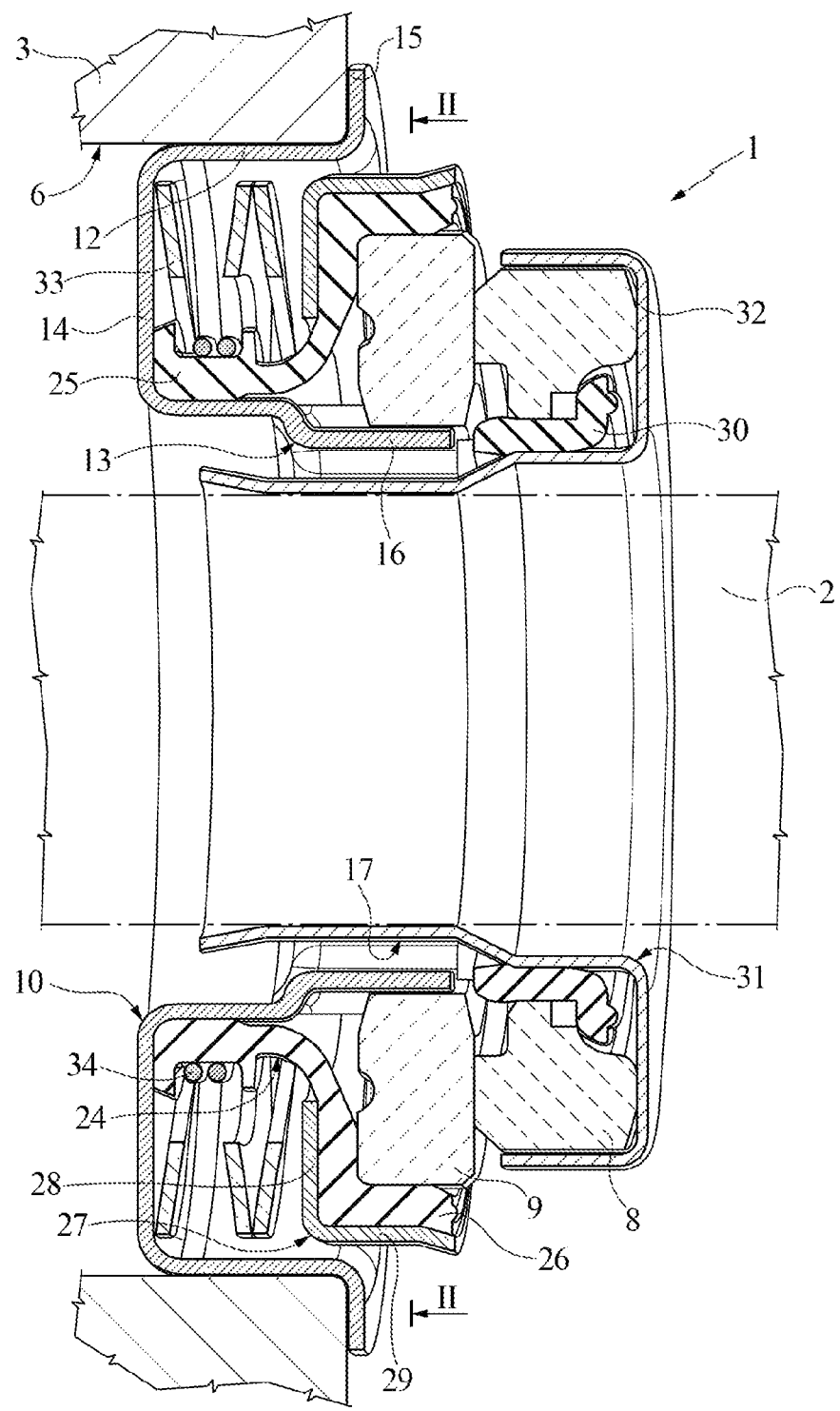
FIG. 1 shows an axial section of a seal in accordance with the present invention.

Number 1 in FIG. 1 indicates as a whole a mechanical seal designed for insertion between a rotating shaft 2 and a fixed casing 3 having an opening 6 through which shaft 2 is fitted. Shaft 2 and casing 3 may, for example, be defined by the shaft and body of an automotive water pump (not shown).

Seal 1 comprises, in known manner, a first sealing ring 8 fitted integrally to and rotating with shaft 2; and a second sealing ring 9 fitted to pump body 3. Sealing rings 8 and 9 cooperate axially with each other to form a sliding face seal.

Sealing rings 8 and 9 are conveniently made of ceramic, e.g. silicon carbide, and may, for example, be made using the method described in WO2007/057934.

More specifically, seal 1 comprises an annular cup 10 made of drawn sheet metal and having a substantially C-shaped radial section open on the side facing sealing rings 8 and 9. Cup 10 comprises a cylindrical outer wall 12; a substantially cylindrical inner wall 13; and a substantially flat end wall 14. Cylindrical outer wall 12 has an outer radial annular end flange 15, and is fitted inside opening 6 of pump body 3. And flange 15 rests axially against pump body 3 to position seal 1 axially with respect to pump body 3.

Inner wall 13 surrounds shaft 2 with a certain amount of radial slack.

Figure 2:
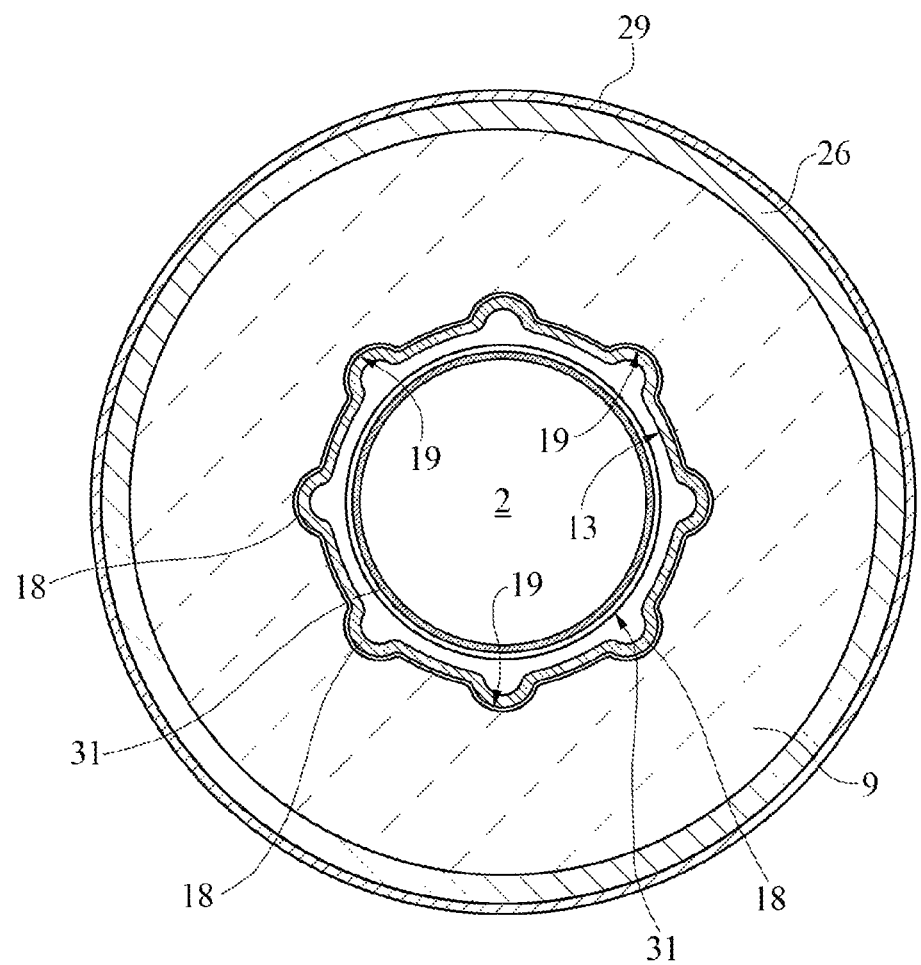
FIG. 2 shows a section along line II-II in FIG. 1.

Second sealing ring 9 is fitted to an end portion 16 of inner wall 13 of cup 10 by a splined coupling 17 with enough slack to permit free relative axial slide and a limited amount of relative rotation. Splined coupling 17 is defined by a number of radial projections 18 extending axially, equally spaced angularly about the circumference of end portion 16, and having a rounded cross section; and by corresponding grooves 19 in second sealing ring 9 (FIG. 2).

Second sealing ring 9 is also fitted hermetically to cup 10 by a bellows 24 of elastomeric material, which has one end 25 fitted to inner wall 13 of cup 10, and an opposite end 26 interposed between second sealing ring 9 and a metal ring 27 surrounding and partly enclosing second sealing ring 9. More specifically, ring 27 has a substantially L-shaped cross section, with a flat radial wall 28 and a cylindrical outer wall 29.

First sealing ring 8 is fitted, with the interposition of a ring 30 of elastomeric material, to a sleeve 31 fitted to shaft 2 and extending partly inside inner wall 13 of cup 10.

Sleeve 31 forms an integral contoured annular end flange 32 housing and prismatically connected to first sealing ring 8, and which serves as an axial stop.

Mechanical seal 1 also comprises a spring 33 housed in cup 10 and compressed between end wall 14 of cup 10 and wall 28 of metal ring 27, to push second sealing ring 9 against first sealing ring 8 with a predetermined work load.

In the example shown, spring 33 is an undulated helical spring made from a flat strip, like the springs marketed, for example, by Smalley under the trade name Crest-to-Crest®.

Alternatively, spring 33 may be defined by a conventional cylindrical coil spring, or by a stack of annular (Belleville or crinkle) washers.

According to the present invention, end 25 of bellows 24 is connected to inner wall 13 of cup 10 by a connection designed to form a static seal, but in angularly free manner.

Said connection is preferably made by a cylindrical-wire helical spring 34 fitted around end 25, and which exerts on end 25 a radial load sufficient to form a static seal, but not sufficient enough to prevent rotation.

Spring 33 is preferably defined by a helical spring with a small number of—preferably fewer than three—turns, and with a small spacing between the turns—preferably less than twice the wire diameter. In the example shown, spring 33 has two packed turns.

Alternatively, spring 33 may be defined by an elastic ring of any convenient material.

Seal 1 operates as follows. In actual use, first sealing ring 8 rotates integrally with shaft 2, while second sealing ring 9 is substantially fixed. So ring 8 rotates in sliding manner with respect to ring 9, under the load exerted by spring 33.

Despite the materials and surface finish of rings 8 and 9 being selected to promote the formation of a constant fluid gap ensuring steady relative motion conditions, situations causing surface adhesion of rings 8 and 9 may occasionally occur as a result, for example, of poor lubrication caused by air bubbles or by other factors resulting in irregular operating fluid flow.

Unlike the known art, in which end 25 of bellows 24 is fixed to cup 10, bellows 24 in the present invention is fitted to cup 10 in angularly free manner. So any adhesion of sealing rings 8 and 9, which would cause second sealing ring 9 to rotate with first sealing ring 8, produces limited rotation, as opposed to substantially torsional elastic deformation, of bellows 24. The elasticity of bellows 24 therefore produces no self-induced torsional oscillation, which is the primary cause of noise.

Clearly, further changes may be made to mechanical seal 1 without, however, departing from the protective scope of the accompanying Claims.

The invention claimed is:

1. A seal (1) designed for insertion between a rotating shaft (2) and a fixed casing (3) having an opening (6) through which the shaft (2) is fitted, in particular for an engine coolant circulating pump, and comprising a sleeve (31) designed to fit onto the shaft (2); a first sealing ring (8) fitted to the sleeve (31); a cup (10) designed to fit inside said opening (6); and a second sealing ring (9) connected to said cup (10) by a bellows (24) of elastomeric material; said first and second sealing rings (8, 9) cooperating frontally with each other under the axial load exerted by an elastic means (33) that comprises a first spring (33) interposed between the cup (10) and the second sealing ring (9); and the seal being characterized by said bellows (24) being connected to said cup (10) so as to be free to rotate with respect to said cup (10); the seal including an annular elastic member (34) which is in contact with and exerts on said bellows (24) a radial load sufficient to form a static seal with an inner wall (13) of said cup (10), but not sufficient to prevent rotation of said bellows (24) with respect to said inner wall (13), wherein said annular elastic member is a second spring (34) that is distinct from said first spring (33).

2. A seal as claimed in claim 1, characterized in that said bellows (24) comprises a first end (25) fitted to the inner wall (13) of said cup (10); and a second end (26) fixed to said second sealing ring (9); said annular elastic member (34) being fitted onto said first end (25) of the bellows (24).

3. A seal as claimed in claim 2, characterized in that said spring is a helical spring (34).

4. A seal as claimed in claim 3, characterized in that said helical spring (34) has no more than three turns.

5. A seal as claimed in claim 3, characterized in that said helical spring (34) has two turns.

6. A seal as claimed in claim 3, characterized in that the spacing between the turns of said helical spring (34) is less than twice the diameter of a wire constituting the helical spring.

7. A seal as claimed in claim 6, characterized in that the turns of the helical spring (34) are packed axially.

8. A seal as claimed in claim 2, characterized in that said second end (26) of said bellows is fixed to said second sealing ring (9) by a metal ring (27) surrounding and at least partly enclosing the second sealing ring (9) and a radial planar wall (28).

9. A seal as claimed in claim 8, characterized in that said elastic means comprise at least a second spring (33) compressed axially between said cup (10) and said metal ring (27).

10. A seal as claimed in claim 9, characterized in that said second spring (33) is an undulated helical spring made from a flat strip.

11. A seal as claimed in claim 1, wherein said bellows (24) is located radially inward with respect to said annular elastic member (34) relative to a center longitudinal axis of said cup (10).

12. A seal as claimed in claim 2, wherein said second end (26) of said bellows (24) is located radially outward with respect to said second sealing ring (9) relative to a center longitudinal axis of said cup (10).

13. A seal (1) designed for insertion between a rotating shaft (2) and a fixed casing (3) having an opening (6) through which the shaft (2) is fitted, in particular for an engine coolant circulating pump, and comprising a sleeve (31) designed to fit onto the shaft (2); a first sealing ring (8) fitted to the sleeve (31); a cup (10) designed to fit inside said opening (6); and a second sealing ring (9) connected to said cup (10) by a bellows (24) of elastomeric material; said bellows (24) including an integral first flange extending radially outward at a first end thereof and an integral second flange extending radially outward and spaced from the first flange; said first and second sealing rings (8, 9) cooperating frontally with each other under the axial load exerted by an elastic means (33) that comprises a first spring (33) interposed between the cup (10) and the second sealing ring (9); and the seal being characterized by said bellows (24) being connected to said cup (10) so as to be free to rotate with respect to said cup (10); the seal including an annular elastic member (34) which exerts on the bellows a radial load sufficient to form a static seal with an inner wall (13) of the cup (10), but not sufficient to prevent rotation of the bellows (24) with respect to said inner wall (13), said radial load being applied in a radially inward direction relative to a center longitudinal axis of said cup (10), wherein said annular elastic member is a helical spring (34) disposed and contained between the integral first flange and the integral second flange, said first spring (33) being distinct from said helical spring (34).

14. A seal as claimed in claim 13, wherein said annular elastic member (34) is separate from said elastic means (33).

15. A seal as claimed in claim 13, wherein said annular elastic member (34) is disposed radially inward with respect to said elastic means (33) relative to a center longitudinal axis of said cup (10).

16. A seal as claimed in claim 13, wherein said annular elastic member (34) is in direct contact with said bellows (24).

17. A seal as claimed in claim 1, wherein said first sealing ring (8) seats against both an outer wall and an end flange (32) of the sleeve (31).

18. A seal (1) designed for insertion between a rotating shaft (2) and a fixed casing (3) having an opening (6) through which the shaft (2) is fitted, in particular for an engine coolant circulating pump, and comprising a sleeve (31) designed to fit onto the shaft (2); a first sealing ring (8) fitted to the sleeve (31); a cup (10) designed to fit inside said opening (6); and a second sealing ring (9) connected to said cup (10) by a bellows (24) of elastomeric material; said bellows (24) including an integral first flange extending radially outward at a first end thereof and an integral second flange extending radially outward and spaced from the first flange; said first and second sealing rings (8, 9) cooperating frontally with each other under the axial load exerted by an elastic means (33) that comprises a first spring (33) interposed between the cup (10) and the second sealing ring (9); and the seal being characterized by said bellows (24) being connected to said cup (10) so as to be free to rotate with respect to said cup (10); the seal including an annular elastic member (34) which exerts on the bellows a radial load sufficient to form a static seal with an inner wall (13) of the cup (10), but not sufficient to prevent rotation of the bellows (24) with respect to said inner wall (13), said radial load being applied in a radially inward direction relative to a center longitudinal axis of said cup (10), wherein said annular elastic member is a coiled spring (34) disposed and contained between the integral first flange and the integral second flange, said first spring (33) being distinct from said coiled spring (34).

19. A seal as claimed in claim 18, wherein the second flange is disposed proximate to a curved portion of the bellows (24) and the first flange and second flange contains containment surfaces that face one another and are parallel to one another.

* * * * *